United States Patent
Sugano et al.

(10) Patent No.: US 6,440,189 B1
(45) Date of Patent: Aug. 27, 2002

(54) AIR CONDITIONING APPARATUS WITH DETACHABLE FILTER

(75) Inventors: Hisashi Sugano; Hideaki Kako, both of Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/538,100

(22) Filed: Mar. 29, 2000

(30) Foreign Application Priority Data

Mar. 30, 1999 (JP) .......................... 11-089785

(51) Int. Cl.⁷ .................... B01D 46/52; B60H 3/06
(52) U.S. Cl. .................. 55/385.3; 55/497; 55/511; 55/521; 123/198 E; 454/139; 454/158
(58) Field of Search ....................... 55/385.1, 385.2, 55/481, 497, 511, 521, DIG. 31; 123/198 E; 454/139, 158

(56) References Cited

U.S. PATENT DOCUMENTS

| 5,531,892 A | * | 7/1996 | Duffy ......................... 55/54 |
| 5,643,079 A | * | 7/1997 | Miyata et al. ................. 55/54 |
| 5,679,122 A | * | 10/1997 | Moll et al. .................... 55/54 |
| 5,792,228 A | * | 8/1998 | Fath et al. .................... 55/54 |
| 5,792,229 A | * | 8/1998 | Sassa et al. ................... 55/54 |
| 6,039,777 A | * | 3/2000 | Lee ....................... 55/DIG. 31 |
| 6,039,779 A | * | 3/2000 | Butz et al. ............. 55/DIG. 31 |

FOREIGN PATENT DOCUMENTS

| JP | 404367703 A | * | 12/1992 | ............ 55/DIG. 31 |
| JP | 405103931 A | * | 4/1993 | ............ 55/DIG. 31 |
| JP | A-6-226024 | | 8/1994 | |
| JP | 406269624 A | * | 9/1994 | ............ 55/DIG. 31 |
| JP | A-8-215528 | | 8/1996 | |

* cited by examiner

Primary Examiner—David A. Simmons
Assistant Examiner—Minh-Chau T. Pham
(74) Attorney, Agent, or Firm—Harness, Dickey & Pierce, PLC (57) ABSTRACT

A filter for a vehicle air conditioning apparatus is composed of only a filter medium, and is disposed in a case. A first support member supports a peripheral portion of the filter and a second support member supports a central portion of the filter in the case to prevent deformation of the filter. The filter composed of only the filter medium can be bent, and be detached from the case in a narrow space. It is not necessary to detach opposing parts such as a glove compartment to detach the filter.

35 Claims, 6 Drawing Sheets

AIR CONDITIONING APPARATUS WITH DETACHABLE FILTER

CROSS REFERENCE TO RELATED APPLICATION

This application is based upon and claims the benefit of Japanese Patent Applications No. 11-89785 filed on Mar. 30, 1999, the contents of which are incorporated herein by reference.

BACKGROUND OF THE INVENTION

1. Field of the Invention

This invention generally relates to an air conditioning apparatus including a detachable filter for purifying conditioned air, which is suitably used for conditioning air in a vehicle compartment.

2. Description of the Related Art

In a vehicle air conditioning apparatus, a filter is generally accommodated in a case, which defines an air passage therein, together with a blower and a heat exchanger. The filter is detachable through an opening of the case for cleaning or exchange, and includes soft filter medium disposed within a rigid support case. The support case prevents the filter medium from being deformed by air flow resistance.

On the other hand, however, the support case inhibits the filter medium from being flexibly deformed (for example, bent) for detachment, and requires s space equal to or larger than the size thereof in a filter detachment direction. Since the case of the air conditioning apparatus is usually installed between dash board and an instrument panel, it is difficult to secure such a large space. Therefore, opposing parts such as a glove component must be detached before the filter is detached. These works lengthen the time for detaching the filter.

SUMMARY OF THE INVENTION

The present invention has been made in view of the above problem. An object of the present invention is to enable detachment of a filter in a narrow space and shorten a work time required for the detachment.

According to the present invention, an air conditioning apparatus has a filter, which is capable of being bent and is disposed to cross an air passage defined in a case. The case has an opening portion for detaching the filter therefrom, and includes a first support member for supporting a peripheral portion of the filter and a second support member for supporting a central portion of the filter. The first and second support members prevent the filter from being deformed in the case. Further, because the filter can be bent, the filter can be detached from the case through the opening portion readily in a narrow space, resulting in shortened work time for detaching the filter.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS (First Embodiment)

Figure 1:
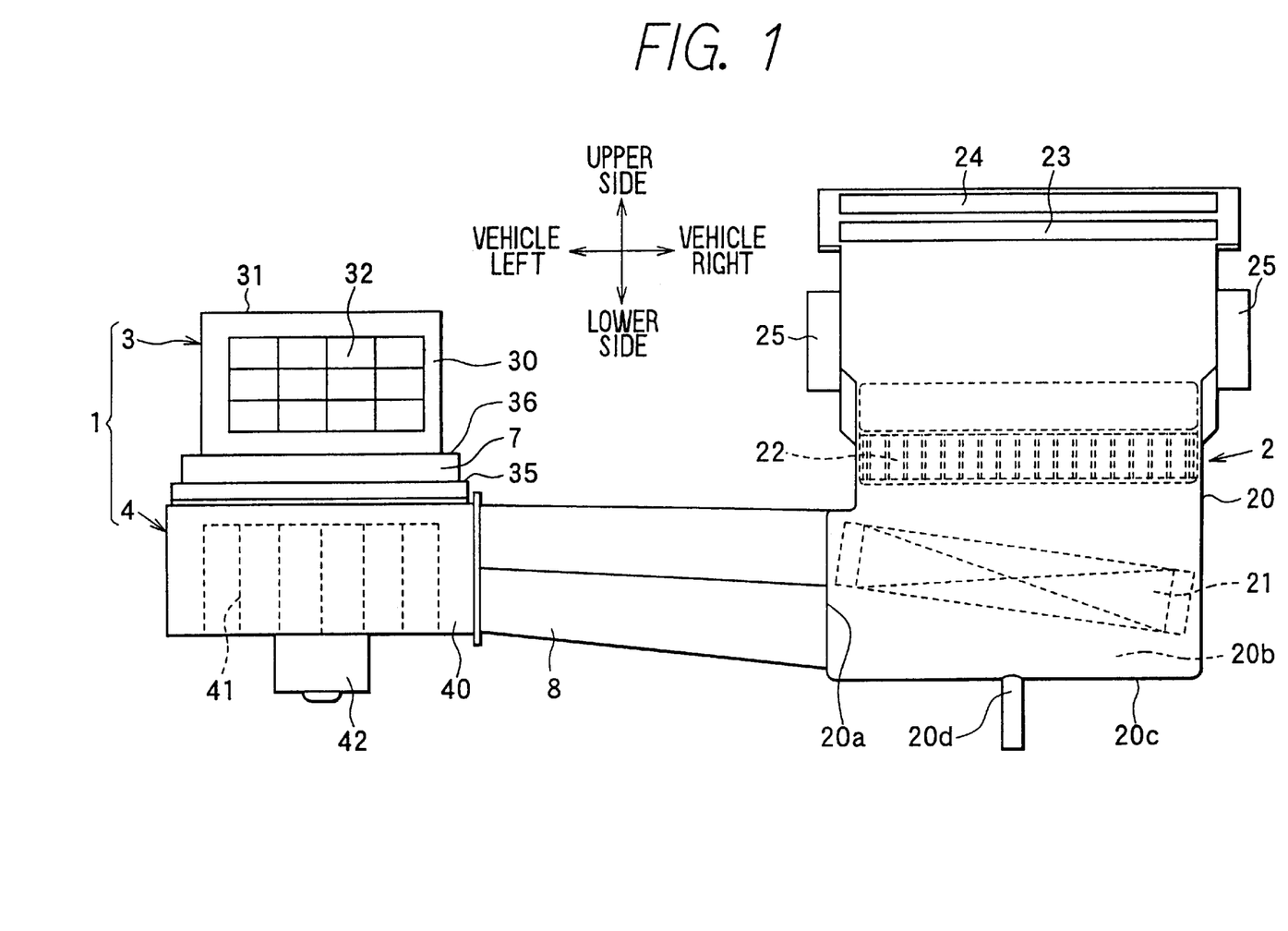
FIG. 1 is a front view showing a vehicle air conditioning apparatus in a first preferred embodiment of the present invention.

A first preferred embodiment of the present invention will be explained referring to FIGS. 1 to 4. Referring first to FIG. 1, a vehicle air conditioning apparatus is mainly composed of a blower unit 1 and an air conditioning unit 2. The blower unit 1 is installed to be offset from a central portion of an instrument panel 100 to a passenger seat side, i.e., to a left side in a vehicle lateral direction when a vehicle has a steering wheel at a right side thereof. The air conditioning unit 2 is installed in the central portion of the instrument panel 100.

Figure 2:
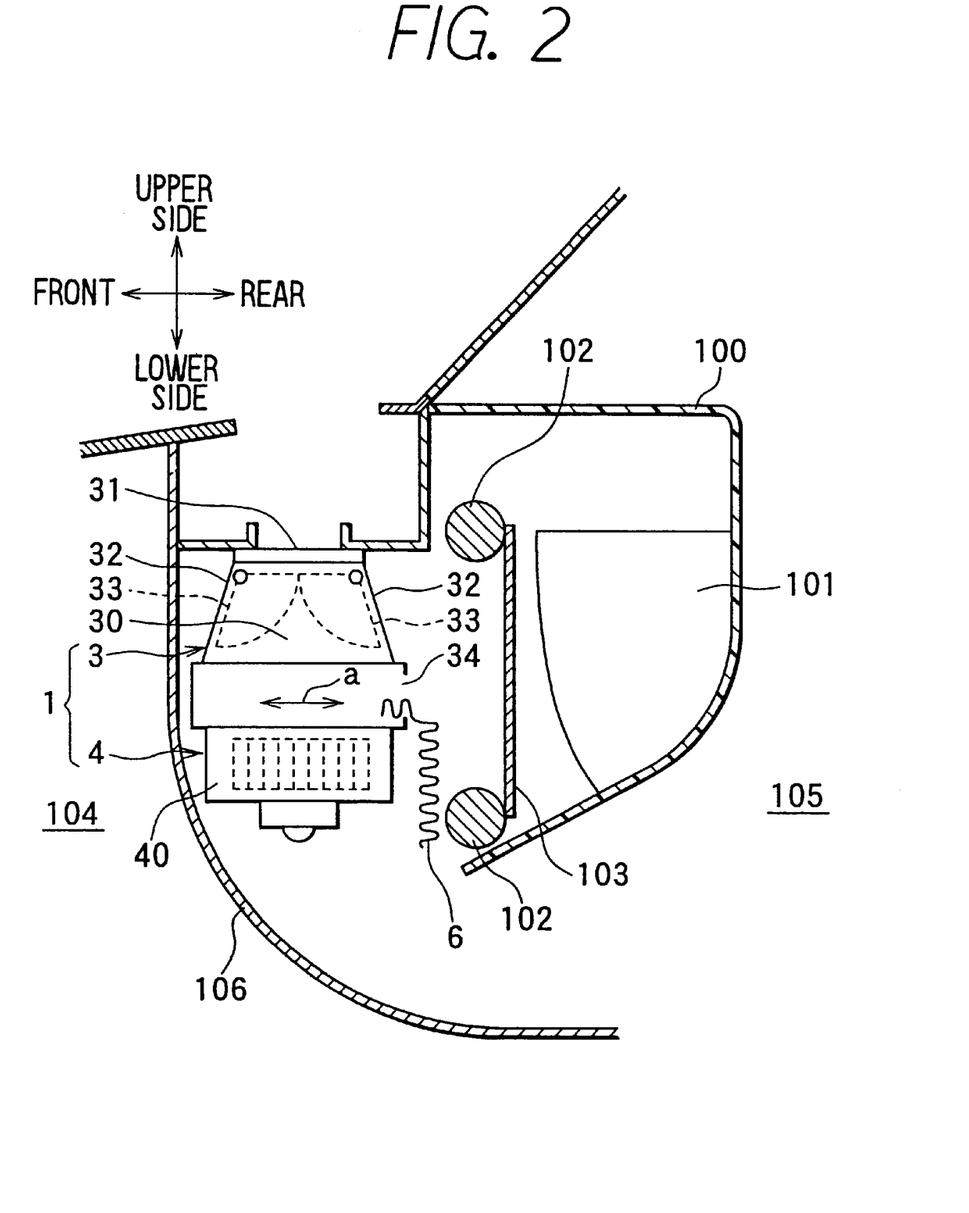
FIG. 2 is a cross-sectional view showing a blower unit installed in a vehicle and a periphery of the blower unit in the first embodiment.
Figure 3:
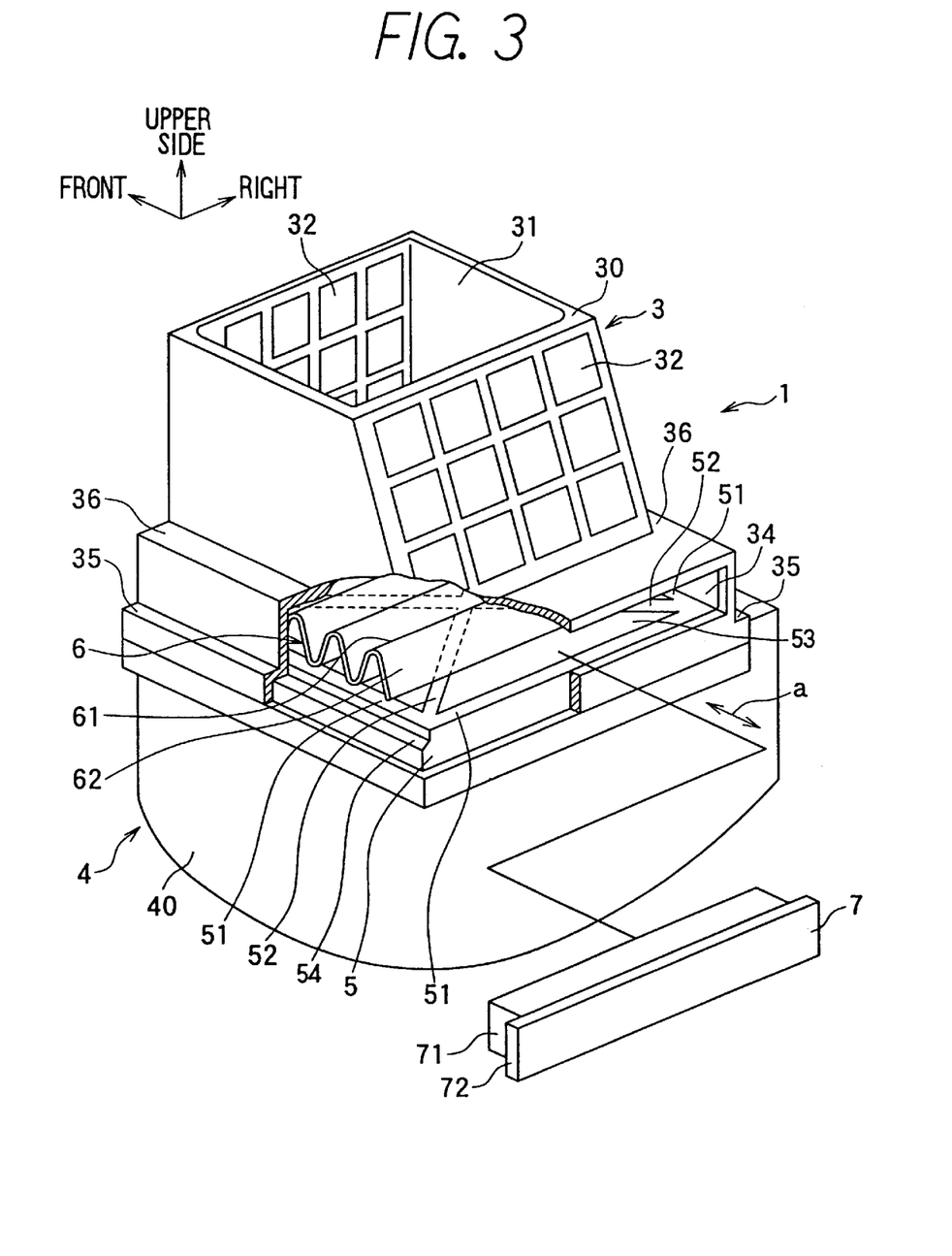
FIG. 3 is a perspective view showing the blower unit.

As shown in FIG. 2, a glove component 101, a reinforcement frame 102, and a reinforcement panel 103 are disposed inside the instrument panel 100. An engine room 104 and a vehicle compartment 105 are partitioned by a dash board 106, and the blower unit 1 is disposed between the reinforcement frame 102 and the dash board 106. The blower unit 1 is equipped with an inside/outside air switch box 3 for selectively guiding inside air or outside air, and a blower 4 at the lower side of the inside/outside air switch box 3, for blowing conditioned air off.

The inside/outside air switch box 3 has a resin-made switch box case 30 in which an air passage is formed. The case 30 is formed with an outside air inlet 31 open in an upper wall thereof and two inside air inlets 32 respectively open in vehicle front side and rear side walls. Two side/outside air switch doors 3 are accommodated in the case 30 for selectively closing or opening the inlets 31, 32.

A rectangular opening portion 34 described below is formed in the lower side and vehicle rear side wall of the case 30 for detachment of a filter. First stepped portions 35 are provided at the lower side of the case 30 at vehicle right and left sides, and second stepped portions (movement restriction members) 36 are provided at the middle portion of the case 30 at the vehicle right and left sides.

The blower 4 is composed of a resin-made blower case (scroll casing) 40 in which an air passage is defined, a blower fan 41 accommodated in the case 40, and a motor 42 for driving the blower fan 41. The blower fan 41 is a centrifugal multi-blade fan (scirocco fan). A rotation shaft of the fan 41 extends approximately in a vertical direction. Air is sucked from the inside/outside air switch box 3 by the rotation of the fan 41, passes through a bell-mouth like suction inlet (not shown) provided at the upper portion of the blower case 40, and then flows toward an outlet of the blower-case 40 approximately in a horizontal direction (from the left side to the right side of the compartment).

Figure 4:
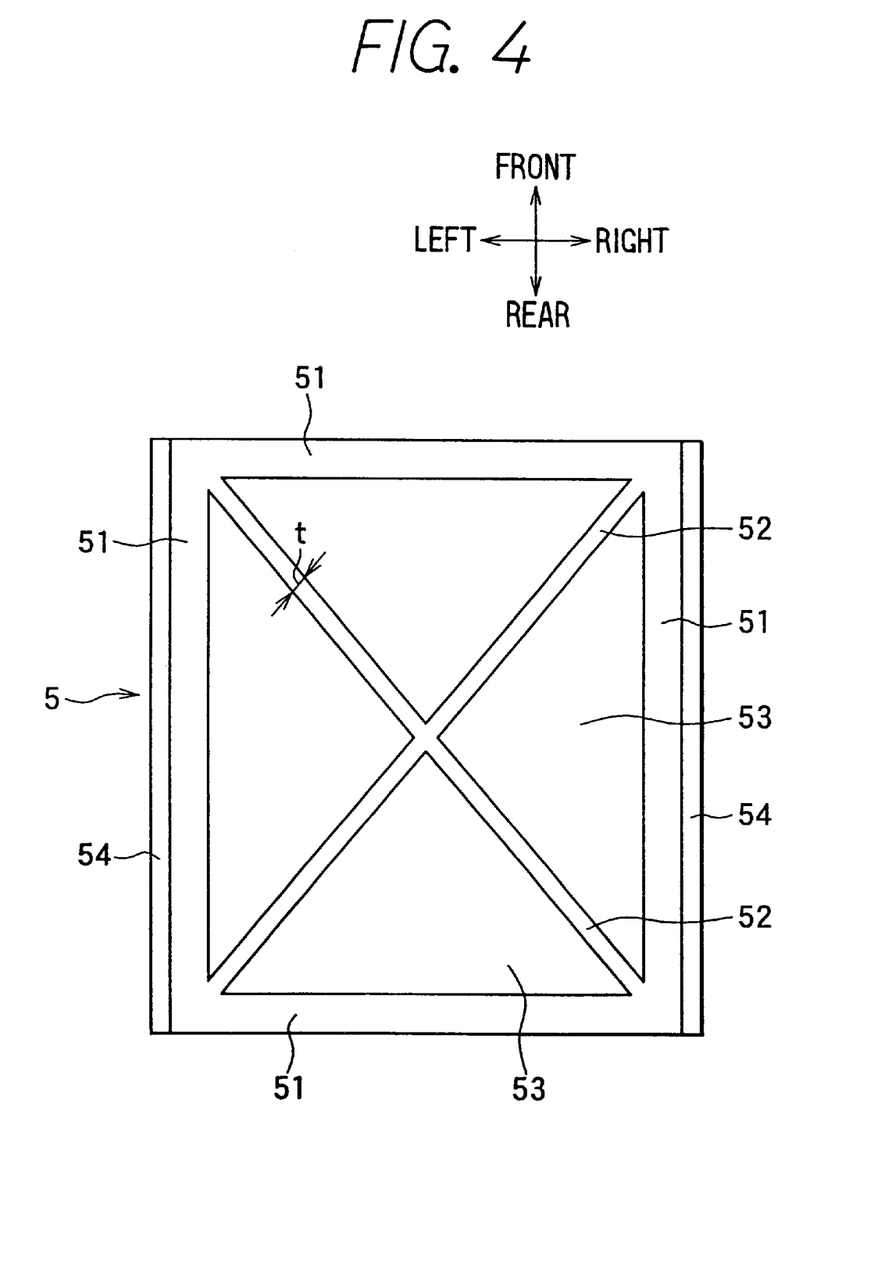
FIG. 4 is a plan view showing a plate of the blower unit.

Both the lower end opening portion of the switch box case 30 and the upper end opening portion of the blower case 40 are rectangle, and a resin-made rectangular plate 5 is disposed between the cases 30 and 40 to cross the air passage. As shown in FIG. 4, the plate 5 has a rectangular frame (first support portion) 51, and ribs (second support portions) 52 each connecting diagonal corners of the frame 51, thereby forming four opening portions 53 as air flow passages in spaces defined by the frame 51 and the ribs 52.

Further, stepped portions 54 are provided at an outside of the frame 51 at right and left sides of the vehicle, and are retained between the first stepped portions of the switch box case 30 and the upper end portion of the blower case 40. Accordingly, the plate 5 is fixed. The switch box case 30 and the blower case 40 are connected to each other by screws, clips, or the like. Thickness t of the ribs 52 are set to approximately 1 mm to secure areas of the opening portions 53 as large as possible.

A filter 6 is disposed at an air flow upstream side of the plate 5 to clarify conditioned air by trapping dust in the air. The filter 6 is composed of only filter medium made of filter paper, non woven fabric, or the like. The filter medium is formed into a corrugated shape by bending to successively have corrugated portions 62. The filter medium can be readily deformed in the direction (corrugated direction) in which the corrugated portions 62 are arranged. The filter 6 is assembled so that top portions 61 of the corrugated portions 62 are perpendicularly to a filter detachment direction (vehicle front-rear direction). Each top portion 61 crosses the ribs 52 obliquely.

The filter 6 is supported by the frame 51 of the plate 5 at a peripheral portion thereof, and is supported by the ribs 52 at the central portion thereof. Both ends of each top portion 61 of the filter 6 are interposed between the second stepped portions 36 of the switch box case 30 and the frame 51 of the plate 5. Accordingly, the filter 6 is restricted from being displaced in the air flow direction (vertical direction) by the second stepped portions 36 and the frame 51. After the filter 6 is assembled, a protruding portion 71 of a resin-made cover 7 is fitted into and closes the opening portion 34. The cover 7 is fixed to the switch box case 30 in a well-known manner utilizing elastic deformation of resin.

On the other hand, referring back to FIG. 1, the air conditioning unit 2 has a resin-made air conditioning case 20. The air conditioning case 20 is formed into generally a box shape as a whole, and is composed of several casing members for accommodating therein instruments described below.

An air inlet portion 20a is provided in a lower side wall of the air conditioning case 20 opposed to the blower case 40. The air inlet portion 20a communicates with the air outlet of the blower case 40 via an intermediate duct 8 interposed therebewteen. An air flow space 20b extends inside the air conditioning case 20 at the lower most side entirely in the vehicle lateral direction. Blown-off air enters the air flow space 20b through the air inlet portion 20a. An evaporator (air conditioning heat exchanger) 21 of a refrigerating cycle is disposed approximately horizontally above the air flow space 20b. Accordingly, air blown off from the blower unit 1 is introduced into the evaporator 21 from the lower side to the upper side.

A drain pipe 20d is integrally formed with a bottom wall 20c of the air conditioning case 20, and a drain hose (not shown) is connected to the lower end of the drain pipe 20d. Condensed water dropped onto the bottom wall 20c is discharged outside through the drain pipe 20d and the drain hose. The evaporator 21 is composed of plural flat tubes laminated with and joined to one another, and aluminum corrugated fins each disposed between adjacent two tubes. Each tube is composed of two thin plates made of metal such as aluminum having high corrosion resistance, and joined to each other. The tubes and the corrugated fins constitute a core portion for cooling air. Blown-off air is cooled down while passing through the core portion by exchanging heat with refrigerant flowing inside the tubes.

A heater core (air conditioning heat exchanger) 22 is disposed approximately horizontally at an air flow downstream side (vehicle upper side) of the evaporator 21 and at the vehicle front side. The heater core 22 has a constitution substantially the same as that of the evaporator 21, and heats blown-off air using engine cooling water (hot water) as a heat source. A bypath passage not shown is provided at the vehicle rear side of the heater core 22 so that air can bypath the heater core 22.

An air mix door is rotatably disposed between the evaporator 21 and the heater core 22 to control an amount of air (hot air), which is introduced into the heater core 22 to be heated, and an amount of air (cool air), which is introduced into the bypath passage. Hot air discharged from the heater core 22 and cool air discharged from the bypath passage are mixed to form air having a specific temperature. A face opening portion 23 is open at the vehicle rear side on the upper face portion of the air conditioning case 20. The face opening portion 23 communicates with a face outlet (not shown) for blowing air off into the compartment upper portion (toward a passenger head part).

A defroster opening portion 24 is open at the vehicle front side in the upper wall of the air conditioning case 20. The defroster opening portion 24 communicates with a defroster outlet (not shown) for blowing air off toward an inner wall of a vehicle windshield glass. Foot opening portions 25 are open in the vehicle right and left side walls of the air conditioning case 20, and communicate with foot outlets (not shown) for blowing air off toward a foot part of the passenger in the compartment. Two mode switch doors (not shown) are rotatably disposed in the air conditioning case 20 to open or close the opening portions 23 to 25. The cases 20, 30, 40, the plate 5, the cover 7, and the duct 8 are respectively formed from resin such as polypropylene having high strength and flexibility.

Next, an operation in the present embodiment will be explained. When an air conditioner switch not shown is turned on, in FIG. 1, air enters the inside/outside air switch box 3, flows in the bower case 40 approximately in the horizontal direction while being blown by the blower 4, and is introduced into the intermediate duct 8. Then, air enters the evaporator 21 from the lower side to be defumidified and cooled therein, flows upward, and then is introduced into the heater core 22 to be heated. Hot air discharged from the heater core 22 and cool air discharged from the bypath passage is mixed to thereby form conditioned air having a specific temperature. The conditioned air is distributed into the outlets by the mode switch door, and then blown off into the compartment.

The filter 6 does not have a filter support case for preventing deformation thereof. However, the filter 6 is supported by the frame 51 of the plate 5 at the peripheral portion thereof, and by the ribs 52 at the central portion thereof. Because of this, the filter 6 is not deformed by air flow resistance when the air conditioning apparatus is operated.

Next, a process of detaching and attaching the filter 6 for maintenance will be explained below. First, referring to FIG. 2, the cover 7 is detached through a space between the blower unit 1 and the reinforcement frame 102 under the instrument panel 100 so that the opening portion 34 is opened. Next, an end portion of the filter 6 is pulled and extracted downwardly. At that time, the direction in which the filter 6 is extracted corresponds to the corrugated direction of the filter 6. Therefore, as shown in FIG. 2, the filter 6 can be readily deformed to be readily extracted from the opening portion 34.

When the filter 6 that has been cleaned or a new filter 6 is assembled again, the filter 6 is brought near to the opening portion 34 through the space between the blower unit 1 and the reinforcement frame 102. A front end portion of the filter 6 is inserted into the opening portion 34, and then, the filter 6 is pushed. The filter 6 is moved while being guided by the second stepped portions 36 and the frame 51 of the plate 5, and is assembled at an appropriate position on the plate 5. Then, the cover 7 is attached again to close the opening portion 34, thereby finishing the process.

According to the present invention, the frame 51 and the ribs 52 of the plate 5 prevent the filter 6 from being deformed by air flow resistance. It is not necessary to use a conventional filter support case. Therefore, when the maintenance of the filter 6 is performed, it is not necessary to detach the support case when the filter 6 is detached. The cost of the filter 6 not having the support case is largely reduced. Further, because the filter 6 can be bent in the corrugated direction, the filter 6 can be detached or attached in a narrow space to be detached or attached. As a result, the process of detaching and attaching the filter 6 can be performed in a largely shortened time.

Because air flows in the filter 6 from the upper side to the lower side, the filter 6 can be positioned horizontally on the plate 5. Because of this, the filter is supported on the plate 5 by air flow resistance when air flows, and by the self-weight thereof when no air flows. Further, because the second stepped portions 36 and the frame 51 of the plate 5 guide the filter 6 when the filter 6 is installed, the filter 6 can be disposed at a specific position in the air passage readily and accurately.

(Second Embodiment)

A second preferred embodiment of the present invention will be explained with reference to FIGS. 5 to 7, in which the same parts and components as those in the first embodiment are indicated by the same reference numerals. In the second embodiment, the structures of the switch box case 30, the plate 5, the filter 6, and the cover 7 are changed.

Figure 5A:
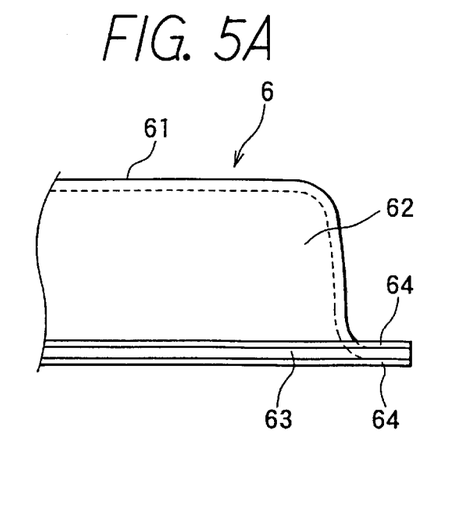
FIGS. 5A and 5B are a front view and a side view showing a filter in a second preferred embodiment of the present invention.
Figure 5B:
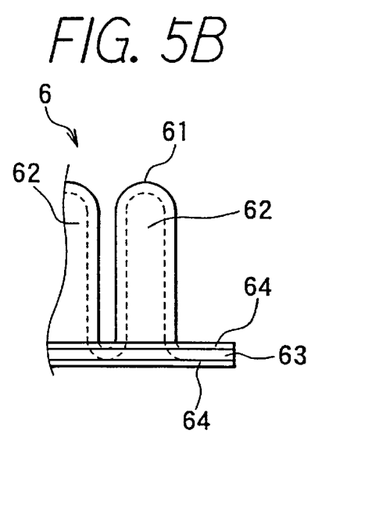

Specifically, referring to FIGS. 5A and 5B, the filter 6 has a flange-like thin plate portion 63 at an entire lower end portion of the corrugated portions 62, and films 64 bonded to both side faces of the thin plate portion 63. The films 64 are made of resin having a small frictional coefficient, and are approximately 0.1 mm in thickness. Therefore, the filter 6 can be readily bent when it is detached or attached.

Figure 6:
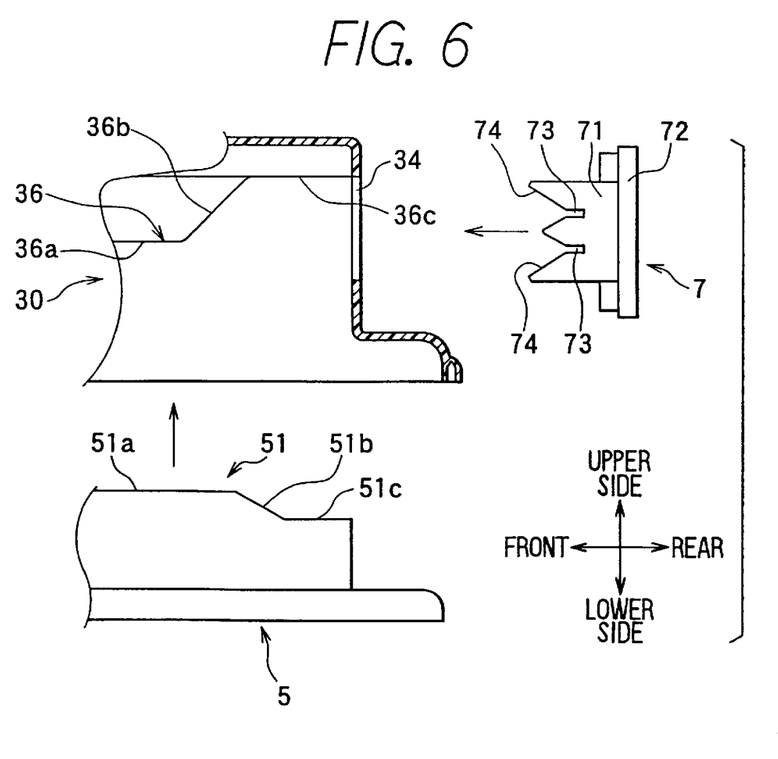
FIG. 6 is a cross-sectional view showing main parts other than the filter in an exploded state in the second embodiment.
Figure 7A:
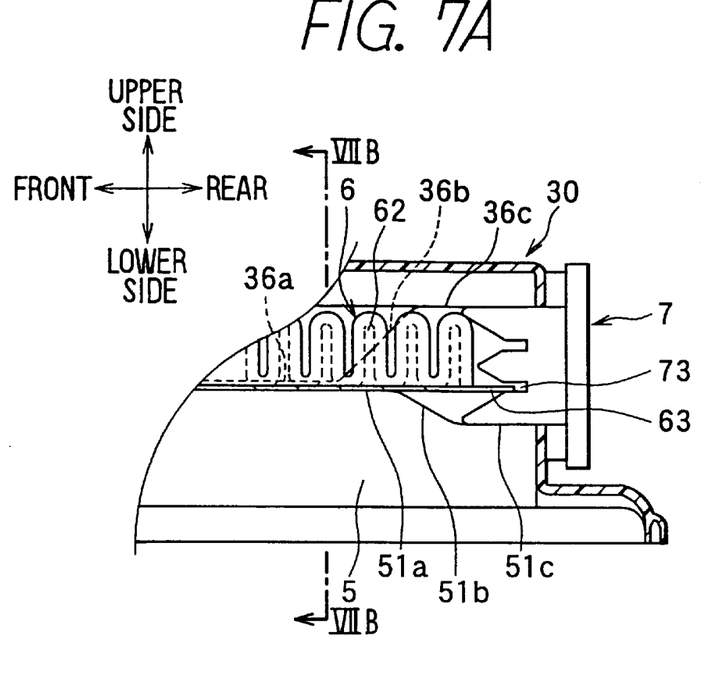
FIG. 7A is a cross-sectional view showing the assembled main parts in the second embodiment.
Figure 7B:
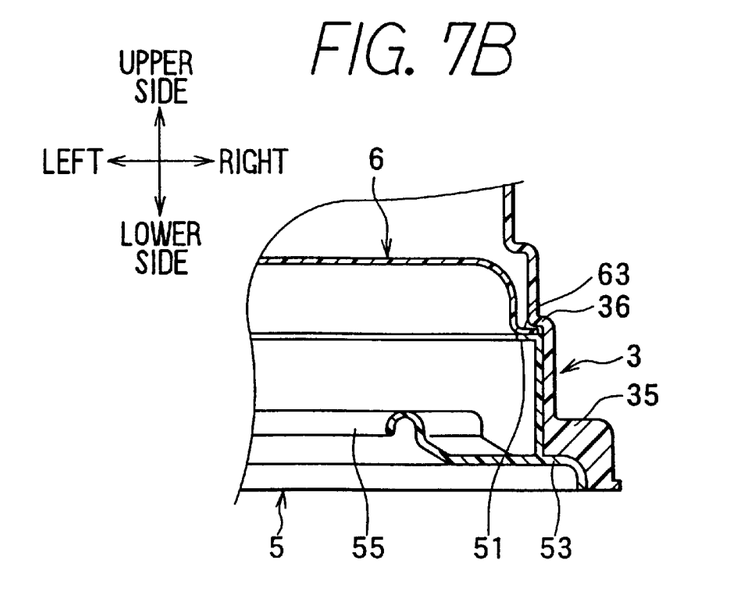
FIG. 7B is across-sectional view taken along line VIIB—VIIB in FIG. 7A.

FIG. 6 shows a state before the switch box case 30, the plate 5, and the cover 7 are assembled with one another. Each second stepped portion 36 of the switch box case 30 has a support face 36a, which is positioned adjacently to the thin plate portion 63, a tapered face 36b, and a guide face 36c. The tapered face 36b is tapered to extend from the support face 36a to the side of the opening portion 34, and the guide face 36c extends in parallel from the tapered face 36b to the upper end of the opening portion 34. The tapered face 36b and the guide face 36c constitute a guide portion.

Each side portion of the frame 51 of the plate 5 in the vehicle lateral direction has a support face 51a for supporting the thin plate portion 63 of the filter 6, a tapered face 51b, and a guide face 51c. The tapered face 51b is tapered to extend from the support face 51a to the side of the opening portion 34, and the guide face 51c extends in parallel from the tapered face 51b to the lower end of the opening portion 34. The tapered face 51b and the guide face 51c constitute a guide portion. The plate 5 further has a bell-mouth like suction port 55 as the inlet of the blower 4 as shown in FIG. 7B, and the ribs (not shown) similarly to the first embodiment.

On the other hand, the cover 7 has a shape symmetrical in the vertical direction, and the protruding portion 71 is formed with slit portions 73 and tapered faces 74. The thin plate portion 63 of the filter 6 positioned at the vehicle rear side, i.e., at the side of the opening portion 31, is inserted into one of the slit portions 73.

The process of detaching and attaching the filter 6 is substantially the same as that in the first embodiment. That is, referring again to FIG. 2, the cover 7 is detached first through the space between the blower unit 1 and the reinforcement frame 102 under the instrument panel 100. Next, the thin plate portion 63 of the filter 6 is pulled and extracted downwardly. Because a hand or the like can readily grasp the thin plate portion 63, this step is easy. Then, when the filter 6 after cleaned or a new filter 6 is assembled again, the thin plate portion 63 of the filter 6 is inserted into the opening portion 34, and the filter 6 is pushed to be assembled at a specific position. The cover 7 is attached again to close the opening portion 34, thereby finishing this process as shown in FIGS. 7A and 7B.

Here, the filter 6 is inserted from the lower side. Therefore, when the thin plate portion 63 of the filter 6 is inserted into the opening portion 34, the thin plate portion 63 abuts the guide face 36c of the second stepped portion 36, and then the filter 6 is pushed in this state. Accordingly, the thin plate portion 63 is moved while being guided by the guide face 36c and the tapered face 36b sequentially.

The lower end of the tapered face 36b of the second stepped portion 36 is provided at the vehicle front side of the upper end of the tapered face 51b of the frame 51. That is, a distance of the lower end of the tapered face 36b from the opening portion 34 is longer than that of the upper end of the tapered face 51b. Because of this, the thin plate portion 63 abuts the support face 51a, and inserted into a gap between the support face 36a and the support face 51a readily while being guided by the support face 51a. As a result, the filter 6 is positioned at the specific position readily and accurately.

The films 64 adhered to the thin plate portion 63 slidably move on the support faces 36a and 51a. Because the frictional coefficient of the films 64 is smaller than that of the filter medium, a sliding resistance is small when the filter 6 is assembled. This additionally makes it more smooth to assemble the filter 6.

While the present invention has been shown and described with reference to the foregoing preferred embodiments, it will be apparent to those skilled in the art that changes in form and detail may be made therein without departing from the scope of the invention as defined in the appended claims.

For example, the present invention can be applied to various air conditioning apparatuses in addition to the vehicle air conditioning apparatus in the embodiments described above. In the embodiments described above, the air conditioning unit 2 is positioned in the central portion of the instrument panel 100, and the blower unit 1 is positioned to be offset to the passenger seat side. However, the present invention is also applicable to the other types of vehicle air conditioning apparatuses.

Although the filter 6 is disposed horizontally in the embodiments described above, the filter 6 may be disposed, for example, vertically in accordance with the type of the air conditioning apparatus. Although the filter 6 is disposed at the air flow upstream side of the blower 4, the filter 6 may be disposed between the blower 4 and the evaporator 21. The shape of the filter 6 is not limited to the corrugated shape, provided that the filter 6 can be readily bent in one direction.

What is claimed is:

1. An air conditioning apparatus comprising:
   a case defining an air passage in which air flows;
   a blower disposed in the air passage for blowing the air; and
   a filter disposed to cross the air passage for purifying the air, the filter having a corrugated shape and capable of being bent, wherein:
   the case has an opening portion for detaching the filter therefrom, and includes a first support member for supporting peripheral portion of the filter and a second support member for supporting a central portion of the filter therein;
   the case further includes a blower case portion in which the blower is accommodated, the blower case portion has a suction port from which air is introduced to be blown by the blower;
   the first and second support members are provided in the case to define a filter attachment space at an air flow upstream side of said first and second support members in which the filter is held to be supported by the first and second support members after the filter is inserted from the opening portion into the case;
   the filter is capable of being bent almost at an entire region in a detachment direction thereof and
   the second support member is disposed to be opposite to a part of a downstream side surface of the filter at least at the center portion after the filter is inserted into the case from the opening portion.

2. The air conditioning apparatus of claim 1, wherein the case has a movement restriction member for restricting the filter from being moved toward an air flow upstream side of the filter.

3. The air conditioning apparatus of claim 2, wherein the first support member and the movement restriction member are opposed to each other and extend in a detachment direction in which the filter is detached.

4. The air conditioning apparatus of claim 3, wherein:
   the first support member and the movement restriction member extend from the opening portion in the detachment direction; and
   at least one of the first support member and the movement restriction member has a guide portion at an end thereof at a side of the opening portion, the guide portion being expanding toward the opening portion.

5. The air conditioning apparatus of claim 3, wherein:
   the filter has a flange portion at a periphery thereof; and
   the flange portion is inserted between the first support member and the movement restriction member of the case.

6. The air conditioning apparatus of claim 5, wherein the detachment direction of the filter approximately corresponds to a corrugated direction of the filter in which the filter is corrugated.

7. The air conditioning apparatus of claim 3, wherein the detachment direction of the filter approximately corresponds to a corrugated direction of the filter in which the filter is corrugated direction of the filter in which the filter is corrugated.

8. The air conditioning apparatus of claim 1, wherein the second support member is a plate having a surface supporting the filter.

9. The air conditioning apparatus of claim 1, wherein:
   the case holds a plate therein and the plate has the first support member and the second support member.

10. The air conditioning apparatus of claim 1, wherein:
    the case is installed between a dash board of a vehicle and an instrument panel of the vehicle; and
    the opening portion is provided in a wall of the case at a vehicle rear side.

11. An air conditioning apparatus comprising:
    a case defining thin an air passage in which air flows;
    a blower disposed in the case for blowing air; and
    a filter disposed in the case while being supported by the case for purifying the air, the filter having a filter medium, the filter medium having a corrugated shape and being solely detachable from the case; wherein:
    the case has an opening portion for detaching the filter medium therefrom, and includes a first support member for supporting a peripheral portion of the filter medium and a second support member for supporting a central portion of the filter medium therein;
    the case further includes a blower case portion in which the blower is accommodated, the blower case portion has a suction port from which air is introduced to be blown by the blower;
    the first and second support members are provided in the case to define a filter medium attachment space at an air flow upstream side of said first and second support members in which the filter medium is held to be supported, by the first and second support members after the filter medium is inserted from the opening portion into the case;
    the filter medium is capable of being bent almost at an entire region in a detachment direction thereof and
    the second support member is disposed to be opposite to a part of a downstream side surface of the filter medium at least at the center portion after the filter medium is inserted into the case from the opening portion.

12. The air conditioning apparatus of claim 11, wherein the case has a plate therein for supporting the filter at an air downstream side of the filter.

13. The air conditioning apparatus of claim 12, wherein the plate has a frame portion for supporting a peripheral portion of the filter and a rib crossing the air passage for supporting a central portion of the filter.

14. The air conditioning apparatus of claim 11, wherein the case has an opening portion for detaching the filter medium therefrom in a detachment direction therethrough.

15. The air conditioning apparatus of claim 14, wherein:
    the filter medium is corrugated in a corrugated direction approximately perpendicular to the opening portion so that the filter medium is detached in the corrugated direction through the opening portion.

16. The air conditioning apparatus of claim 14, wherein the filter medium is deformable in the detachment direction when the filter medium is detached from the case.

17. The air conditioning apparatus of claim 11, wherein the case has a first case having the opening portion and holding the filter therein, and a second case connected to the first case at an air downstream side of the first case and holding the blower therein.

18. An air conditioning apparatus comprising:
    a case defining therein an air passage in which air flows;
    a blower disposed in the case for blowing the air;

a filter medium disposed in the case for purifying the air and deformable in a specific direction; wherein:

the case has an opening portion for detaching the filter medium therefrom, and includes a first support member for supporting a peripheral portion of the filter medium and a second support member for supporting a central portion of the filter medium therein;

the case further includes a blower case portion in which the blower is accommodated, the blower case portion has a suction port from which air is introduced to be blown by the blower;

the first and second support members are provided in the case to define a filter medium attachment space at an air flow upstream side of said first and second support members in which the filter medium is held to be supported by the first and second support members after the filter medium is inserted from the opening portion into the case;

the filter medium is capable of being bent almost at an entire region in a detachment direction thereof and the second support member is disposed to be opposite to a part of a downstream side surface of the filter medium at least at the center portion after the filter medium is inserted into the case from the opening portion.

19. The air conditioning apparatus of claim 1, wherein the filter consists of a filter medium.

20. The air conditioning apparatus of claim 1, wherein the filter is corrugated almost at the entire region in the detachment direction thereof.

21. The air conditioning apparatus of claim 1, wherein the filter has a flange portion at a periphery thereof.

22. The air conditioning apparatus of claim 21, wherein a film made of resin is bonded to a side face of the flange portion to reduce a sliding resistance of the filter when the filter is detached.

23. The air conditioning apparatus of claim 1, wherein the opening portion is open at a side of a vehicle compartment.

24. The air conditioning apparatus of claim 1, further comprising a cover for detachably closing the opening portion of the case and supporting a part of the filter in the case.

25. The air conditioning apparatus of claim 24, wherein:

the cover has a protruding portion with a slit; and the filter has a flange portion in the detachment direction, the flange portion being inserted into the slit of the cover in the case.

26. The air conditioning apparatus of claim 25, wherein the protruding portion of the cover has a tapered face.

27. The air conditioning apparatus of claim 11, wherein:

the filter consists of the filter medium; and the filter is detachable from the case solely.

28. The air conditioning apparatus of claim 11, wherein the filter medium is corrugated almost at an entire region thereof in a detachment direction.

29. The air conditioning apparatus of claim 18, wherein the filter medium is corrugated in a corrugated direction in which the filter medium is detached from the case.

30. The air conditioning apparatus of claim 18, wherein:

a resin sheet is attached to a side face of the filter medium to reduce a sliding resistance when the filter medium is detached from the case.

31. The air conditioning apparatus of claim 18, wherein:

the case has an opening portion on a side wall thereof; and the filter medium is detachable from the case through the opening portion by being extracted in a detachment direction.

32. The air conditioning apparatus according to claim 1, wherein the second support member is a rod member having both ends connected to the first support.

33. The air conditioning apparatus according to claim 32, wherein the second support member is disposed to support the filter at a lower side of the filter.

34. The air conditioning apparatus according to claim 1, wherein:

the filter is disposed at an upstream air side of the blower; and the second support member is disposed to have a predetermined distance between the second support member and a wall member of the blower case portion defining the suction port.

35. The air conditioning apparatus according to claim 34, wherein:

the case further includes an air-introduction case portion having an air introduction port from which air introduced into the filter; and the first and second support members are disposed between the air-introduction case portion and the blower case portion.

* * * * *